United States Patent
Sasaki

(10) Patent No.: US 11,933,611 B2
(45) Date of Patent: Mar. 19, 2024

(54) TARGET DIRECTION DETERMINING DEVICE, CONTROL SYSTEM, AND METHOD AND PROGRAM FOR AIMING SURVEYING DEVICE AT A TARGET

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 333 days.

(21) Appl. No.: 17/446,836

(22) Filed: Sep. 3, 2021

(65) Prior Publication Data

US 2022/0090915 A1 Mar. 24, 2022

(30) Foreign Application Priority Data

Sep. 18, 2020 (JP) ................................. 2020-157146

(51) Int. Cl.
*G01C 11/02* (2006.01)

(52) U.S. Cl.
CPC .................. *G01C 11/025* (2013.01)

(58) Field of Classification Search
CPC .............................. G01C 11/025; G01C 15/06
USPC .......................................... 33/228, 290, 283
See application file for complete search history.

(56) References Cited

U.S. PATENT DOCUMENTS

| | | | | |
|---|---|---|---|---|
| 3,528,747 A * | 9/1970 | Walsh | ..................... | G01B 11/26 356/154 |
| 7,193,695 B2 | 3/2007 | Sugiura | | |
| 7,304,729 B2 | 12/2007 | Yasutomi et al. | | |
| 7,345,748 B2 | 3/2008 | Sugiura et al. | | |
| 9,182,229 B2 * | 11/2015 | Grässer | ................... | G01C 15/06 |
| 10,119,818 B2 * | 11/2018 | Maar | ................... | G01B 11/0608 |
| 10,168,153 B2 * | 1/2019 | Grässer | ................... | G01C 15/06 |
| 10,895,632 B2 * | 1/2021 | Ohtomo | ................ | G01S 7/4817 |
| 10,982,957 B2 * | 4/2021 | Ohtomo | ................ | G01C 15/06 |
| 11,333,497 B2 * | 5/2022 | Eisenreich | ........... | G01C 15/006 |

(Continued)

FOREIGN PATENT DOCUMENTS

| | | |
|---|---|---|
| EP | 3702728 A1 | 9/2020 |
| JP | 4177765 B2 | 11/2008 |

(Continued)

OTHER PUBLICATIONS

Extended European Search Report dated Feb. 8, 2022, in connection with European Patent Application No. 21195289.0, 5 pgs.

(Continued)

*Primary Examiner* — George B Bennett
(74) *Attorney, Agent, or Firm* — Chiesa Shahinian & Giantomasi PC

(57) ABSTRACT

A technique enables a surveying device to acquire a direction of a target by using as little extra hardware as possible. A method aims a laser scanner, as a surveying device, at a reflective prism that is a target. The method includes obtaining a photographic image of the laser scanner that is captured by a smartphone from the reflective prism side and determining a direction of the reflective prism as seen from the laser scanner on the basis of the photographic image. The method also includes rotating the laser scanner to make the laser scanner face the reflective prism straight on, on the basis of the direction of the reflective prism as seen from the laser scanner.

6 Claims, 6 Drawing Sheets

(56) References Cited

U.S. PATENT DOCUMENTS

| | | |
|---|---|---|
| 11,592,291 B2 * | 2/2023 | Sasaki .................... G01C 15/06 |
| 2016/0138919 A1 | 5/2016 | Green et al. |
| 2018/0217263 A1 | 8/2018 | Ohtomo et al. |
| 2020/0271758 A1 | 8/2020 | Kumagai et al. |

FOREIGN PATENT DOCUMENTS

| | | |
|---|---|---|
| JP | 4177784 B2 | 11/2008 |
| JP | 4648025 B2 | 3/2011 |
| JP | 2016-050910 A | 4/2016 |
| JP | 2018009957 A | 1/2018 |
| JP | 2020139750 A | 9/2020 |

OTHER PUBLICATIONS

Notice of Reasons for Refusal dated Dec. 22, 2023 in connection with Japanese Patent Application No. 2020-157146, 6 pgs. (including translation).

* cited by examiner

TARGET DIRECTION DETERMINING DEVICE, CONTROL SYSTEM, AND METHOD AND PROGRAM FOR AIMING SURVEYING DEVICE AT A TARGET

BACKGROUND OF THE INVENTION

Technical Field

The present invention relates to control of a surveying device.

Background Art

At a surveying site, it may be necessary to determine coordinates of a specific point. In such a case, a target, such as a reflective prism, is placed at a desired position, and the location of the target is then measured by a surveying device. The location of the target can be measured by automatically operating the surveying device while a worker carries the target by hand to move it.

In this method, there may be a need to make the surveying device face in the direction of the target or be aimed at the target. To satisfy this need, techniques disclosed in Japanese Patents Nos. 4648025, 4177765, and 4177784 are publicly known.

SUMMARY OF THE INVENTION

The techniques disclosed in Japanese Patents Nos. 4648025, 4177765, and 4177784 require dedicated hardware, and thus cause an increase in cost. In view of these circumstances, an object of the present invention is to provide a technique that enables a surveying device to acquire the direction of a target by using as little extra hardware as possible.

The present invention provides a target direction determining device that is configured to determine a direction of a target as seen from a surveying device. The direction of the target as seen from the surveying device is determined on the basis of a photographic image of the surveying device that is captured from the target side.

In the present invention, the surveying device may include a directional indicator that enables determination of the direction in which the surveying device is facing. In the present invention, the direction of the target as seen from the surveying device may be determined on the basis of the direction the surveying device is facing in the photographic image and the direction of an optical axis of the photographic image.

The present invention can also be understood as a control system including the target direction determining device and a control device. The control device is configured to rotate the surveying device to aim the surveying device at the target on the basis of the direction of the target as seen from the surveying device.

The present invention can also be understood as a method for aiming a surveying device at a target. This method includes acquiring a photographic image of the surveying device that is captured from the target side, determining the direction of the target as seen from the surveying device, on the basis of the photographic image, and rotating the surveying device to aim the surveying device at the target on the basis of the direction of the target as seen from the surveying device.

The present invention can also be understood as a method for aiming a surveying device at a target. This method includes acquiring a photographic image of the surveying device that is captured from the target side by a terminal equipped with a camera, and transmitting the photographic image to a processing server by using a communication function of the terminal equipped with the camera. The method also includes determining a direction of the target as seen from the surveying device, on the basis of the photographic image, by the processing server, and rotating the surveying device to aim the surveying device at the target on the basis of the direction of the target.

The present invention can also be understood as a non-transitory computer recording medium storing computer executable instructions for aiming a surveying device at a target. The computer executable instructions, when executed by a computer processor, cause the computer processor to acquire a photographic image of the surveying device that is captured from the target side and to determine a direction of the target as seen from the surveying device, on the basis of the photographic image. The computer executable instructions, when executed by a computer processor, also cause the computer processor to rotate the surveying device to aim the surveying device at the target on the basis of the direction of the target as seen from the surveying device.

The present invention provides a technique that enables a surveying device to acquire a direction of a target by using as little extra hardware as possible.

PREFERRED EMBODIMENTS OF THE INVENTION

1. Overview

Figure 1:
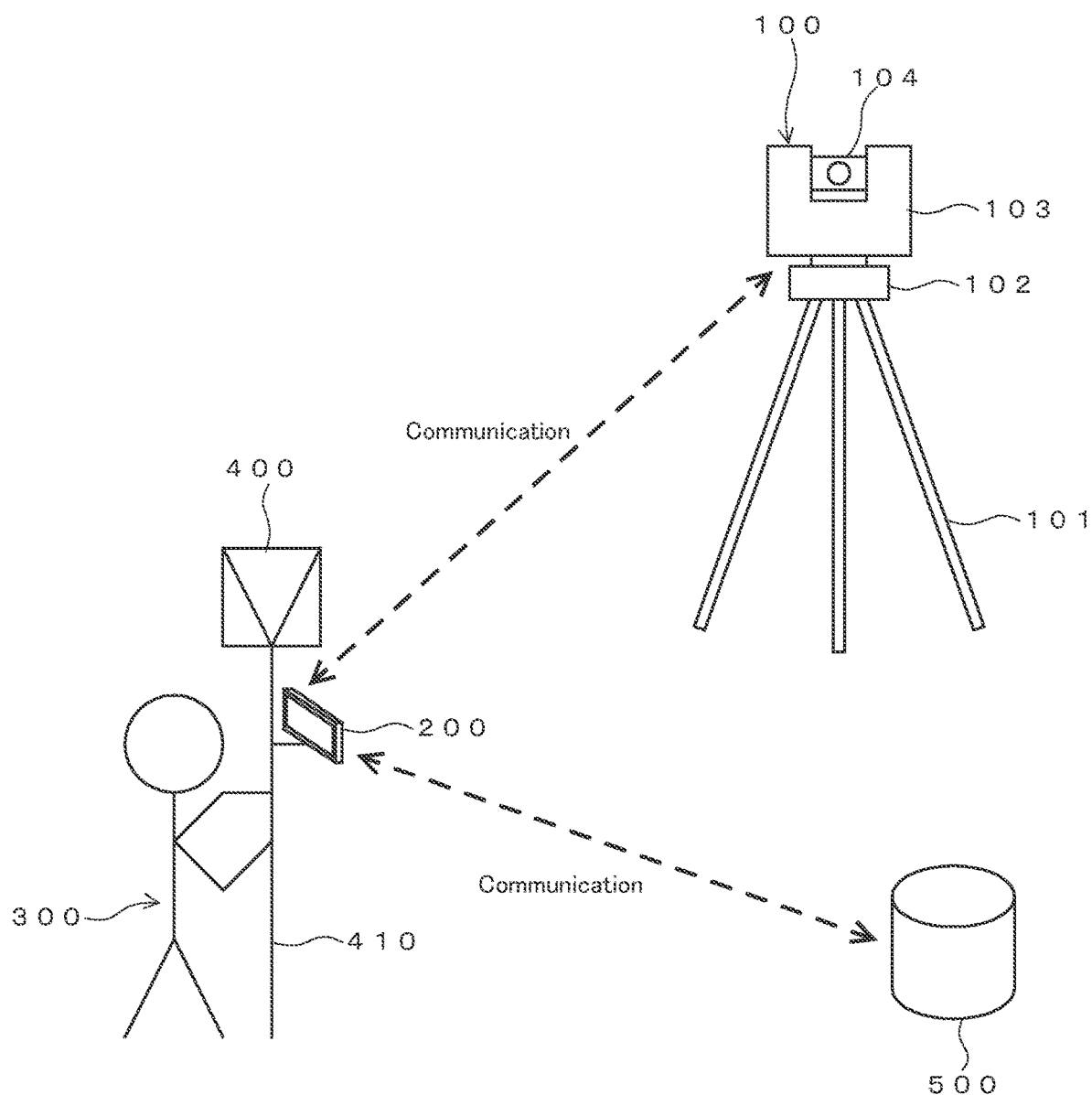
FIG. 1 is an overview of an embodiment.

FIG. 1 shows an overview of an embodiment. This technique is intended to aim a laser scanner 100, as a surveying device, at a reflective prism 400 that is a target. First, the laser scanner 100 is photographed by a smartphone 200 on the reflective prism 400 side, and a photographic image is acquired. On the basis of this photographic image, the direction of the reflective prism 400 as seen from the laser scanner 100 is determined. Then, the laser scanner 100 is rotated to be directed to the reflective prism 400, based on the determined direction.

FIG. 1 shows the laser scanner 100 as a surveying device. In this example, a laser scanning point cloud is obtained by using the laser scanner 100. The surveying device can employ a total station or a total station equipped with a laser scanner.

FIG. 1 shows the reflective prism 400 as a surveying target that a worker 300 can carry by hand. The reflective prism 400 is a reflective prism for surveying, and it reflects an incident light ray in a direction inverted by 180 degrees.

In this example, the smartphone 200 is attached to a support bar 410 for supporting the reflective prism 400, and relative positional relationships between the reflective prism 400 and the smartphone 200 are fixed. The separation distance between the reflective prism 400 and the smartphone 200 is reduced as much as possible. In particular, a separation distance in a lateral direction or horizontal direction orthogonal to a direction of the laser scanner 100 as seen from the reflective prism 400 is 50 cm or less, and is more preferably 30 cm or less. The smartphone 200 is a commercially available ordinary device and includes a camera, a wireless LAN unit, and a data communication function using an internet line.

This example uses the smartphone 200 as a control terminal or controller of the laser scanner 100. It is also possible to utilize a tablet PC or a dedicated terminal as the control terminal.

The worker 300 sets up the reflective prism 400 at a desired location to be measured by the laser scanner 100. The worker 300 then takes a photograph of the laser scanner 100 by using the camera function of the smartphone 200. The image data of this photographic image of the laser scanner 100 is transmitted to a processing server 500. The transmission of the image data from the smartphone 200 to the processing server 500 is performed by using an internet line.

Note that the laser scanner 100 can be photographed in the state in which the worker 300 holds the smartphone 200 in the worker's hand. The photographing in this situation is performed in a condition in which a separation distance between the smartphone 200 and the reflective prism 400 in a horizontal direction orthogonal to a line connecting the reflective prism 400 and the laser scanner 100 is 50 cm or less, and is more preferably 30 cm or less. In addition, prior to photographing, the laser scanner 100 is sighted in a state in which an image of the laser scanner 100 shown on the display of the smartphone 200 is maximally enlarged.

The processing server 500 estimates the direction of the smartphone 200 or the reflective prism 400 relative to the front direction of the laser scanner 100, by using an artificial intelligence (AI) estimation function, on the basis of the photographic image of the laser scanner 100 captured by the smartphone 200.

Figure 2:
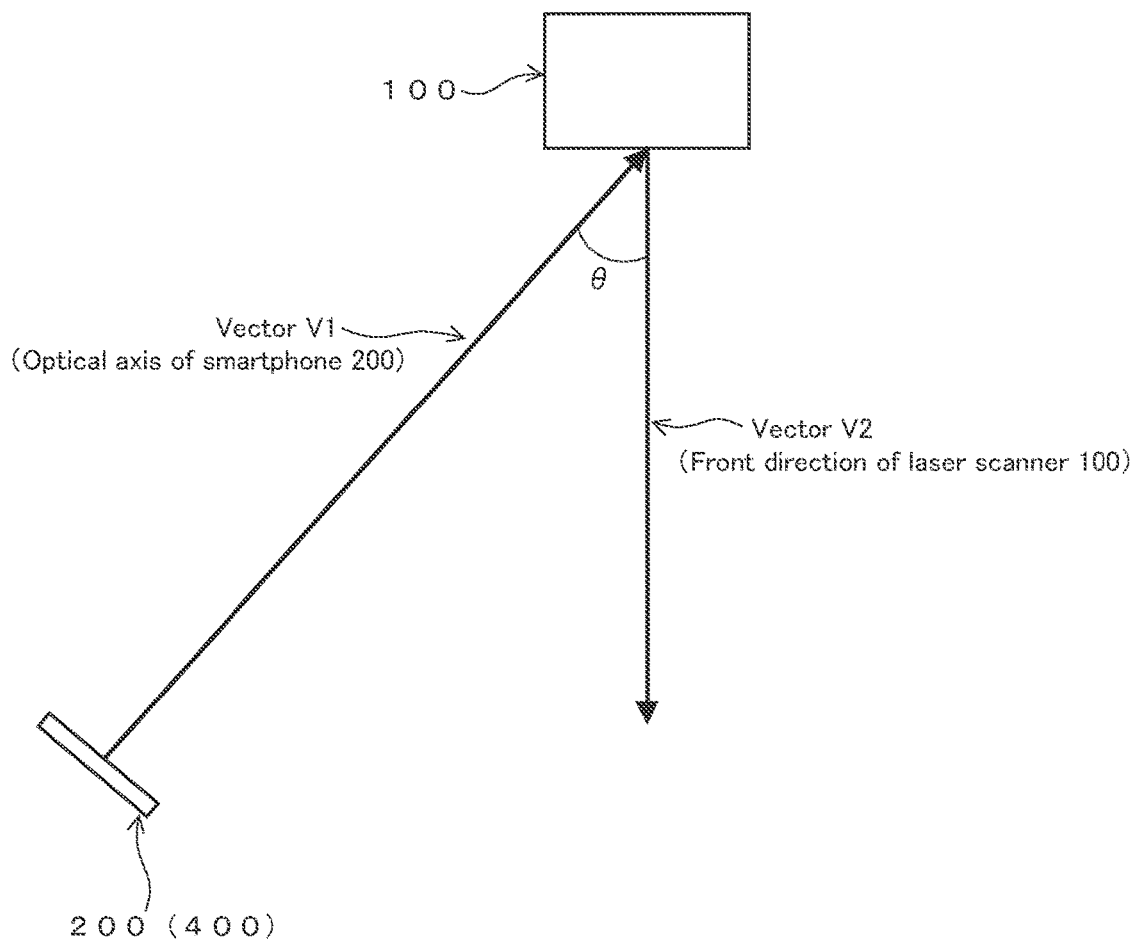
FIG. 2 is a model diagram showing an angular relationship.

FIG. 2 is a model diagram as viewed downwardly from the vertical direction. Note that the positions of the smartphone 200 and the reflective prism 400 differ from each other in a strict sense, but herein, these are assumed to be the same.

FIG. 2 shows a direction of the laser scanner 100 as seen from the smartphone 200 or the reflective prism 400 in the horizontal direction, by a vector V1. The vector V1 coincides with the direction of the optical axis of the smartphone 200. Moreover, the front direction of the laser scanner 100 is represented by a vector V2.

The way the laser scanner 100 is viewed in the photographic image, which is captured by the smartphone 200, is estimated by AI, whereby the direction of the vector V2 relative to the depth direction of the photographic image, that is, the direction of the vector V1, is determined. Specifically, an angle θ between the direction of the laser scanner 100 as seen from the reflective prism 400 (vector V1) and the front direction of the laser scanner 100 (vector V2) is estimated.

After the relationship between the vectors V1 and V2 is estimated, the direction of the reflective prism 400 as seen from the laser scanner 100 relative to the front direction of the laser scanner 100 (vector V2) can be estimated.

Figure 3:
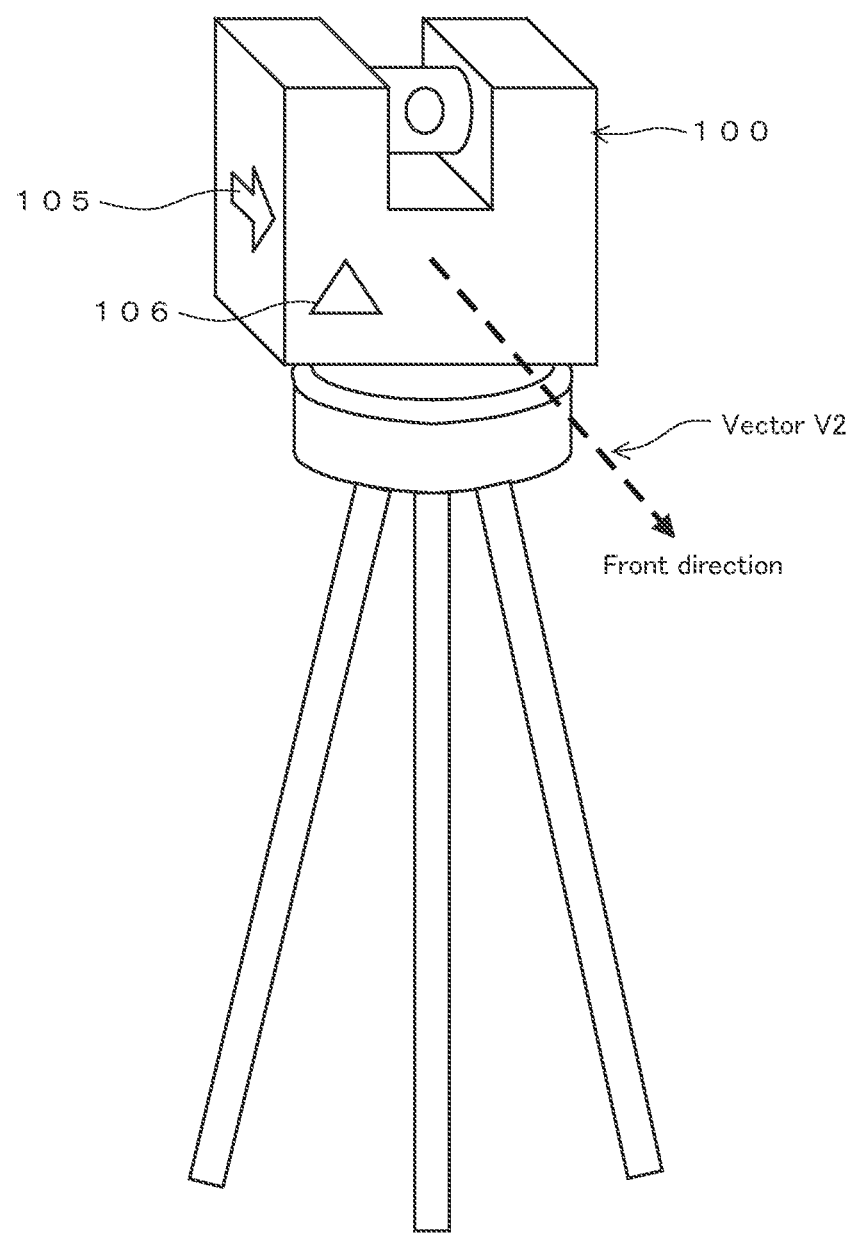
FIG. 3 shows an example of a drawing of a photographic image of a laser scanner.

FIG. 3 conceptually shows a photographic image of the laser scanner 100 captured by the smartphone 200. FIG. 3 shows the laser scanner 100 as viewed downwardly from a slightly oblique direction, for ease of understanding (more exactly, in a horizontal view, the top surface of the laser scanner 100 cannot be seen).

As shown in FIG. 3, an arrow symbol 105 showing the front direction is marked on a side surface of the laser scanner 100, and a triangle symbol 106 showing the front side is marked on the front surface of the laser scanner 100.

In the case in FIG. 3, the depth direction of the paper surface is the direction of the optical axis of the camera of the smartphone 200 or the direction of the vector V1. In the case in FIG. 3, the smartphone 200 is seen from the laser scanner 100, in a slightly rightward direction, which is an approximately the 1 o'clock direction. This state is quantitatively estimated by an AI estimation model. Specifically, on the basis of the photographic image in FIG. 3, a quantitative relationship between the vector V1 (refer to FIG. 2) and the vector V2 is estimated. This provides information of the direction of the reflective prism 400 as seen from the laser scanner 100, relative to the front direction.

In the example of the case in FIG. 3, information such that the smartphone 200 or the reflective prism 400 is seen in a right direction by 30 degrees, from the laser scanner 100, is estimated.

Figure 4:
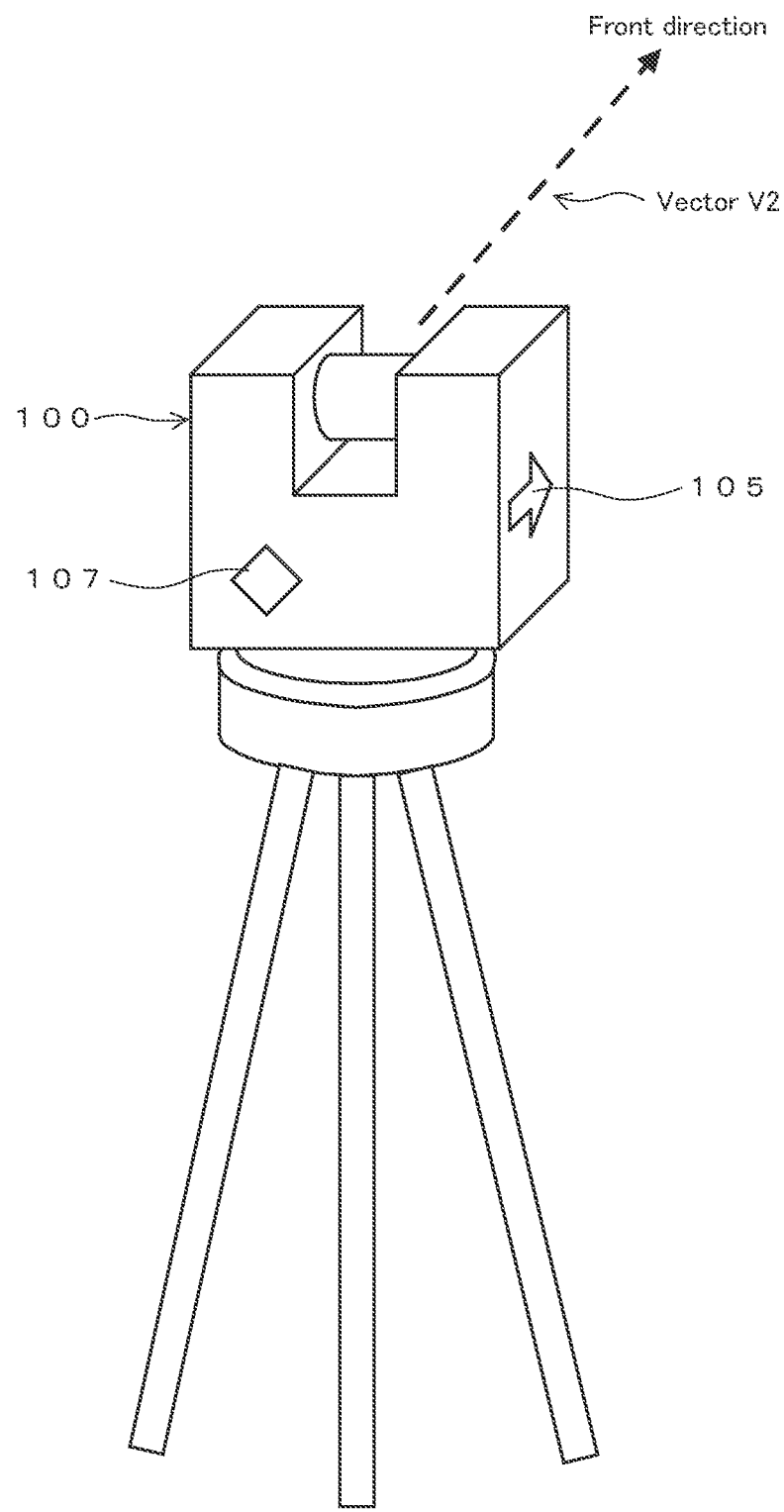
FIG. 4 shows an example of a drawing of a photographic image of the laser scanner.

FIG. 4 conceptually shows another example of the photographic image of the laser scanner 100 captured by the smartphone 200. In this case, the smartphone 200 is seen from the laser scanner 100, in a right rearward direction, which is an approximately the 5 o'clock direction. This state is quantitatively estimated by an AI estimation model.

Specifically, on the basis of the photographic image in FIG. 4, the angle θ in FIG. 2 is calculated by an AI estimation model. In this case, for example, a direction angle such that the smartphone 200 or the reflective prism 400 as seen from the laser scanner 100 is in a clockwise direction by 150 degrees, is estimated.

As shown in FIG. 4, a diamond symbol 107 showing the back surface is marked on the back surface of the laser scanner 100. A photographic image is recognized as an image of the laser scanner 100 captured from the back surface, by detecting this sign.

After the angle θ in FIG. 2 is determined, the laser scanner 100 is rotated so that θ=0, whereby the front surface of the laser scanner 100 is made to face the smartphone 200 or the reflective prism 400.

The laser scanner 100 has a remote control function using a wireless LAN. In this example, a control signal for making the laser scanner 100 horizontally rotate so that θ=0, is generated by the processing server 500, and the control signal is transmitted to the smartphone 200. Then, the control signal is transmitted from the smartphone 200 to the laser scanner 100, and the laser scanner 100 horizontally rotates so that θ=0, accordingly. As a result, the laser scanner 100 is aimed at the reflective prism 400.

2. Configuration of Hardware

As shown in FIG. 1, the laser scanner 100 includes a tripod 101, a base 102 supported by the tripod 101, a main body 103 held on the base 102 in a horizontally rotatable manner, and an optical system 104 disposed to the main body 103 and being vertically rotatable.

Laser scanning in a vertical plane is performed by making the optical system 104 emit distance measuring laser light in a pulsed manner while the optical system 104 is vertically rotated. Simultaneously, the main unit 103 is horizontally rotated. Thus, laser scanning is performed on a surface of the celestial sphere.

Figure 5:
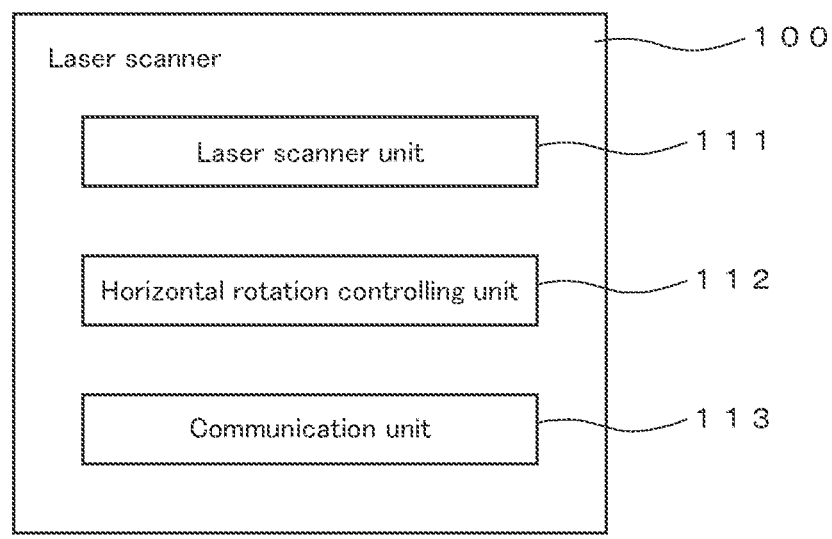
FIG. 5 is a block diagram of the laser scanner.

FIG. 5 is a block diagram of the laser scanner 100. The laser scanner 100 includes a laser scanner unit 111, a horizontal rotation controlling unit 112, and a communication unit 113.

The laser scanner unit 111 performs control and processing relating to the laser scanning described above. The horizontal rotation controlling unit 112 controls horizontal rotation of the main body 103 relative to the base 102.

The communication unit 113 communicates with an external device. Herein, communication is made by using a wireless LAN standard. In this example, the communication unit 113 is used to communicate with the smartphone 200. The laser scanner 100 is able to be controlled remotely by using the communication unit 113. In one example, the laser scanner or surveying device 100 can be controlled remotely via the communication unit 113 by using a dedicated terminal, a PC, a tablet, or a smartphone as a control terminal or controller.

Figure 7:
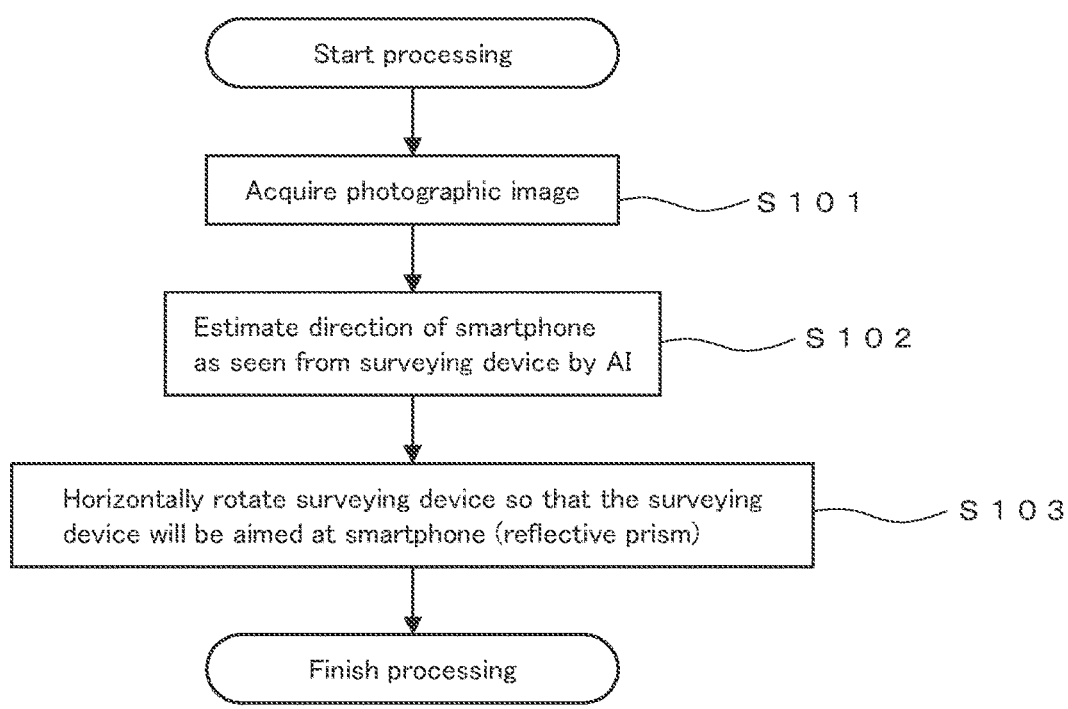
FIG. 7 is a flowchart showing an example of a processing procedure.

In this example, starting and stopping laser scanning, selecting each type of laser scanning mode, and aiming at the target, which is executed by the processing in FIG. 7, can be instructed by the remote control.

Figure 6:
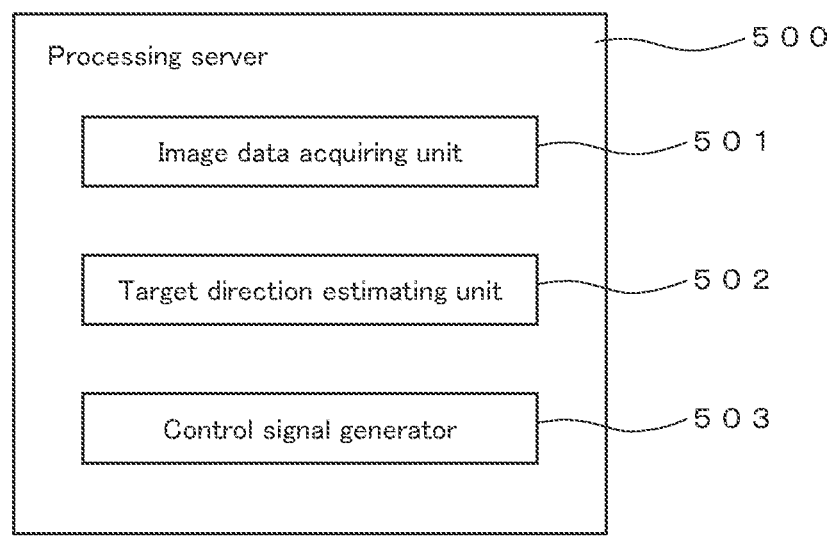
FIG. 6 is a block diagram of a processing server.

FIG. 6 is a block diagram of the processing server 500. The processing server 500 includes an image data acquiring unit 501, a target direction estimating unit 502, and a control signal generator 503. The processing server 500 is a computer and includes a CPU, a memory, a hard disk drive, and various input-output interfaces.

An application software program for implementing the functional units shown in FIG. 6 is installed in the computer that constitutes the processing server 500, and the processing server 500 shown in FIG. 6 is implemented by software. One, some, or all of the functional units of the processing server 500 can also be composed of a dedicated electronic circuit. In one example, one, some, or all of the functional units of the processing server 500 can be composed by using an FPGA.

The image data acquiring unit 501 acquires image data of a photographic image captured by the camera of the smartphone 200. The target direction estimating unit 502 estimates, on the basis of the photographic image of the laser scanner 100 acquired by the image data acquiring unit 501, the direction of the reflective prism 400 as seen from the laser scanner 100, relative to the front surface of the laser scanner 100, by using an AI estimation model. The AI estimation model is obtained by deep learning. Specifically, a direction in which the vector 1 in FIG. 2 is inverted by 180 degrees, is the direction of the reflective prism 400 as seen from the laser scanner 100.

The control signal generator 503 generates a control signal for making the laser scanner 100 rotate so that the angle θ in FIG. 2 will be 0 and making the front surface of the laser scanner 100 direct to the direction of the reflective prism 400.

3. AI Estimation Model

The following describes an AI estimation model that is used in the target direction estimating unit 502.

The AI estimation model is used by inputting a photographic image of the laser scanner 100 captured by the smartphone 200, and it outputs the angle θ in FIG. 2. The AI estimation model is obtained as follows: A learning network that has an AI estimation function is made to acquire a function of estimating the angle θ in FIG. 2 based on the input image, through deep learning.

The learning network is an algorithm having a deep layered neural network and performs deep learning. The leaning network is not specifically limited.

Generation of AI Estimation Model

Sample photographic images of a laser scanner that are captured from various angles in the horizontal direction are prepared. Among these sample photographic images, photographic images in which the values of the angles θ are already known, is used as teaching data.

In one example, 1000 sample photographic images are prepared. The angle θ is prepared for each of the 1000 sample photographic images. Then, these 1000 sample photographic images are divided into a group A of 300 sample photographic images as a learning data group and a group B of 700 sample photographic images as a test data group.

First, the samples of the group A are used to learn the relationship between an input image and an angle θ, whereby an AI estimation model is obtained. At this time, the back propagation method is used in learning.

The back propagation method involves calculating a difference between a determined angle θ, which is an estimated value, and a corresponding correct angle θ, which is a correct value. The method also involves adjusting weighting of a neural network, that is, adjusting a learning network, so that the difference will be minimum. Thereafter, the data of the group B is used to evaluate the model.

The above processes are performed multiple times by changing the pair of the data of the group A and the data of the group B at random. The above processing implements deep learning, whereby an AI estimation model to be used for estimating the angle θ in FIG. 2 from the photographic image of the laser scanner 100 is obtained. The target direction estimating unit 502 uses this AI estimation model to estimate the angle θ (refer to FIG. 2).

4. Example of Processing Procedure

The following describes an example of a processing procedure performed by the processing server 500. FIG. 7 shows an example of a flowchart for executing the processing. The program for executing the processing in FIG. 7 is stored in a storage device of the computer constituting the processing server 500, such as a semiconductor memory or a hard disk drive, and the program is executed by the CPU of the computer. It is also possible to store this program in an appropriate storage medium.

Herein, the positions of the smartphone 200 and the reflective prism 400 are assumed to be the same. In addition, it is also assumed that application software for making the smartphone 200 implement the function as a controller of the laser scanner 100 is installed in the smartphone 200, whereby the laser scanner 100 can be controlled remotely by using the smartphone 200.

First, it is assumed that, in the state in which the worker 300 stands at a desired point to be positioned while holding the reflective prism 400, the laser scanner 100 is desired to face the direction of the worker 300 or the reflective prism 400.

In this situation, the worker 300 takes a photograph of the laser scanner 100 by aiming the camera of the smartphone 200 at the laser scanner 100. At this time, the image of the laser scanner 100 is captured at the center of the screen of the smartphone 200 by enlarging the image shown on the screen as much as possible.

After photographing is completed, the worker 300 operates the smartphone 200 to instruct start of the processing for aiming the laser scanner 200 at the viewpoint at the time of photographing or the position of the smartphone 200.

In response to the above operation, first, image data that is obtained by photographing the laser scanner 100 is transmitted from the smartphone 200 to the processing server 500, and then, this image data is acquired by the processing server 500 (step S101). This process is performed by the image data acquiring unit 501 in FIG. 6.

Next, on the basis of the photographic image acquired in step S101, a direction in the horizontal direction of the smartphone 200 or the reflective prism 400 as seen from the laser scanner 100 is estimated (step S102). This process is performed by the target direction estimating unit 502 in FIG. 6. This process estimates the angle $\theta$ in FIG. 2.

Then, a control signal is generated for making the main body 103 horizontally rotate so that $\theta=0$; that is, the front surface of the laser scanner 100 will be facing the direction of the smartphone 200 or the reflective prism 400 (step S103). This process is performed by the control signal generator 503 in FIG. 6.

This control signal is transmitted to the smartphone 200. The smartphone 200 is connected to the laser scanner 100 by a wireless LAN. The smartphone 200 is configured to control remotely the laser scanner 100 by using the wireless LAN. The control signal relating to the horizontal rotation is transmitted from the smartphone 200 to the laser scanner 100 via the wireless LAN by using the remote control function. Upon receiving this control signal, the laser scanner 100 horizontally rotates so that the angle $\theta$ in FIG. 2 will be 0, so as to face its front surface in the direction of the smartphone 200 or the reflective prism 400.

Under these conditions, laser scanning is performed in a specific range, for example, in a range of plus or minus 5 degrees of horizontal angle, whereby the location of the reflective prism 400 is measured.

5. Advantages

In the state in which the laser scanner 100 is remotely controllable, it is possible for a user to implement a system that aims the laser scanner 100 at the reflective prism 400, which is a target, only by preparing the smartphone 200 having a photographing function. The processing server 500 is required, but the system can be established by preparing software, and existing hardware can be used.

6. Other Matters

The direction of the laser scanner 100 in the photographic image may be calculated by classic image analysis. In this case, the front direction of the laser scanner 100 is determined from the photographic image, and the angle $\theta$ in FIG. 2 is calculated from an extending direction of an edge or a surface of the main body 103. This method and the AI estimation may be used together.

The function of the processing server 500 can also be implemented by a PC, and the worker 300 can carry this PC. Alternatively, instead of the smartphone 200, a tablet PC with a camera can also be used. In this case, if the tablet PC has sufficient calculation capacity, the function of the processing server 500 can be conducted by the tablet PC.

The function of the processing server 500 can be provided to the laser scanner 100. In this case, the laser scanner 100 includes a computer that has the function of the processing server 500. Alternatively, it is also possible to prepare a PC that has the function of the processing server 500 and to execute the function of the processing server 500 by this PC.

The front and back sides of the laser scanner 100 may be distinguished by the shape of the laser scanner 100. In this case, the laser scanner 100 needs to have a shape that enables distinguishing between the front and back sides.

There may be a laser scanner that has no difference in function between the front surface and back sides. In this case, the laser scanner, which has no difference in function between the front and back sides, is rotated so that the front surface or the back surface of the laser scanner will face the smartphone 200 or the reflective prism 400 straight on.

In the case in which the laser scanner 100 is controlled by a dedicated wireless controller, the following processing can be performed. First, the laser scanner 100 is photographed by the smartphone 200. Then, the angle $\theta$ in FIG. 2 is estimated by the processing server 500, and this estimated angle $\theta$ is shown on the smartphone 200. After seeing the displayed angle, the worker 300 operates the controller to horizontally rotate the laser scanner 100 so that $\theta=0$.

What is claimed is:

1. A target direction determining device configured to determine a direction of a target as seen from a surveying device, wherein the direction of the target as seen from the surveying device is determined on a basis of a photographic image of the surveying device that is captured from the target side.

2. The target direction determining device according to claim 1, wherein the surveying device includes a directional indicator that enables determining a direction in which the surveying device faces.

3. The target direction determining device according to claim 1, wherein the direction of the target as seen from the surveying device is determined on a basis of the facing direction of the surveying device in the photographic image and a direction of an optical axis of the photographic image.

4. A control system comprising:
   the target direction determining device according to claim 1; and
   a control device configured to rotate the surveying device to aim the surveying device at the target on a basis of the direction of the target as seen from the surveying device.

5. A method for aiming a surveying device at a target, the method comprising:
   acquiring a photographic image of the surveying device that is captured from the target side;
   determining a direction of the target as seen from the surveying device on a basis of the photographic image; and
   rotating the surveying device to aim the surveying device at the target on a basis of the direction of the target as seen from the surveying device.

6. A method for aiming a surveying device at a target, the method comprising:
   acquiring a photographic image of the surveying device that is captured from the target side by a terminal equipped with a camera;
   transmitting the photographic image to a processing server by using a communication function of the terminal equipped with the camera;
   determining a direction of the target as seen from the surveying device on a basis of the photographic image, by the processing server; and rotating the surveying device to aim the surveying device at the target on a basis of the direction of the target.

* * * * *

UNITED STATES PATENT AND TRADEMARK OFFICE
CERTIFICATE OF CORRECTION

| | |
|---|---|
| PATENT NO. | : 11,933,611 B2 |
| APPLICATION NO. | : 17/446836 |
| DATED | : March 19, 2024 |
| INVENTOR(S) | : You Sasaki |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this
Twenty-second Day of October, 2024

*Katherine Kelly Vidal*
Katherine Kelly Vidal
*Director of the United States Patent and Trademark Office*